(12) United States Patent
Heo et al.

(10) Patent No.: US 6,480,663 B1
(45) Date of Patent: Nov. 12, 2002

(54) OPTICAL FIBER FOR OPTICAL AMPLIFIER

(75) Inventors: Jong Heo, Pohang (KR); Yong-Beom Shin, Pohang (KR); Sun-Tae Jung, Seoul (KR); Hyoun-Soo Kim, Sungnam (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/482,917

(22) Filed: Jan. 14, 2000

(30) Foreign Application Priority Data

Jan. 20, 1999 (KR) .............................. 99-1647

(51) Int. Cl.⁷ .................................. G02B 6/00
(52) U.S. Cl. ...................... 385/141; 385/123; 385/142; 385/144
(58) Field of Search .............................. 385/141, 142, 385/144, 123

(56) References Cited

U.S. PATENT DOCUMENTS

| 5,321,708 A | | 6/1994 | Tohmon et al. |
| 5,379,149 A | * | 1/1995 | Snitzer et al. ............... 359/341 |
| 5,694,500 A | * | 12/1997 | Page et al. .................... 385/24 |
| 5,973,824 A | * | 10/1999 | Sanghera et al. ........... 359/341 |
| 6,148,125 A | | 11/2000 | Heo et al. |

FOREIGN PATENT DOCUMENTS

WO   WO97/03028   1/1997

OTHER PUBLICATIONS

Communication (No. EP00300313.4) issued by the European Patent Office dated Oct. 31, 2001.
Doc. No. XP002180544, dated Feb. 1999, USA.
Doc. No. XP002042717, dated, 1996, NLX.

* cited by examiner

*Primary Examiner*—Brian Healy
*Assistant Examiner*—Sung Pak
(74) *Attorney, Agent, or Firm*—Robert E. Bushnell, Esq.

(57) ABSTRACT

An optical fiber for an optical amplifier, which contains dysprosium ion ($Dy^{3+}$) with an improved light amplification efficiency at the 1.31 $\mu$m band. The optical fiber includes a germanium-gallium-sulfide (Ge—Ga—S) glass, an alkali metal halide, and Dy as a rare earth element. In the optical fiber, the interaction of electrons of $Dy^{3+}$ and phonons in the glass lattice can be minimized, so that the multiphonon relaxation of $Dy^{3+}0$ from $^4F_{11/2}$ and $^6H_{9/2}$ to $^6H_{11/2}$ is slowed down, and thus the fluorescence lifetime at 1.31 $\mu$m is elongated, further improving the fluorescence efficiency of the optical fiber.

20 Claims, 3 Drawing Sheets

OPTICAL FIBER FOR OPTICAL AMPLIFIER

CLAIM OF PRIORITY

This application makes reference to, incorporates the same herein, and claims all benefits accruing under 35 U.S.C. §119 arising from an application for a Optical Fiber For Optical Amplifier earlier filed in the Korean Industrial Property Office on Jan. 20, 1999 and there duly assigned Serial No. 1647/1999.

1. Field of the Invention

The present invention relates to optical fibers for use in optical amplifiers, and more particularly, to an optical fiber for use in an optical amplifier, which contains dysprosium ion ($Dy^{3+}$) and has an improved light amplification efficiency at a 1.31 μm band.

2. Description of the Related Art

In the manufacture of optical amplifiers used to amplify an optical signal having a wavelength of 1.31 μm which belongs to the zero dispersion wavelength of silica glass, rare earth elements, for example, neodymium (Nd), praseodymium (Pr) or dysprosium (Dy) in the form of ions, are commonly implanted into a glass base. However, in the case of doping the glass with $Nd^{3+}$, fluorescence is emitted at a wavelength of 1.31 μm, which is considerably far from the zero dispersion wavelength, during the transition of $^4F_{3/2} \rightarrow ^4I_{13/2}$ of $Nd^{3+}$. The intensity of fluorescence emitted at the $^4F_{3/2}$ level is very weak at a wavelength of 1.31 μm, compared to at other wavelengths, for example, at 890 nm and 1064 nm. Also, due to excited state absorption at the $^4F_{3/2}$ level, optical gain decreases at a wavelength shorter than 1.36 μm. To account for these problems, a fluoride-rich glass has been suggested as a base material, instead of the silica glass. However, the use of the fluoride-rich glass fails to increase the optical gain to a desired level at the wavelength of 1.31 μm.

Also, $Pr^{3+}$, as a rare earth element implanted into a glass in optical fiber manufacture, permits the utilization of fluorescence emission by the transition of $^1G_4 \rightarrow ^3H_5$. Such a transition is more likely to occur than at other energy levels, and thus a high optical amplification efficiency is expected when $Pr^{3+}$ is used as a doping material.

However, the energy difference between the $^1G_4$ and $^3F_5$ levels is very small at 3000 $cm^{-1}$, and thus in using an oxide glass having a high lattice vibration energy of 800 $cm^{-1}$ as a base material, there is a high possibility of nonradiative transition occurring by $Pr^{3+}$ excited to the $^1G_4$ level due to it multiple lattice vibration relaxation. As a result, the light amplification efficiency decreases rather than increases. Thus, in using $Pr^{3+}$ for the purpose of increasing the optical amplification efficiency in the manufacture of optical amplifiers, a base material having a low lattice vibration energy should be accompanied with $Pr^{3+}$.

A fluoride glass containing $ZrF_4$ is widely known as a base material having a low lattice vibration energy. However, such fluoride glass has a low quantum efficiency at 4% or less, and thus it is difficult to obtain satisfactory performance in view of fluorescence lifetime. For this reason, research into use of a sulfide glass which has a lower lattice vibration energy than a fluoride glass, as a base material, has actively conducted.

U.S. Pat. No. 5,321,708 for an Optical Fiber Amplifier Doped With Dysprosium Ion For The 1.3 μm Wavelength Band to Tohmon et al and U.S. Pat. No. 5,694,500 for an Optical Amplifier Operating at 1.3 Microns Useful For Telecommunications And Based On Dysprosium-Doped Metal Chloride Host Materials to Page et al disclose the use of trivalent Dysprosium ions as a dopant for amplification of 1.31 μm wavelengths in optical amplifiers. However, I have not seen the use of dysprosium ions as a dopant for germanium-gallium-sulfide glass or for germanium-gallium-arsenic-sulfide glass.

SUMMARY OF THE INVENTION

An object of the present invention is to provide an optical fiber for use in optical amplifiers, which contains dysprosium ions ($Dy^{3+}$) and has an improved light amplification efficiency at a wavelength of 1.31 μm.

The object of the present invention is achieved by an optical fiber for an optical amplifier, comprising a germanium-gallium-sulfide (Ge—Ga—S) glass, an alkali metal halide, and dysprosium (Dy) as a rare earth element.

Preferably, the content of alkali metal halide is in the range of approximately 1 to 20 mol % based on the total amount of Ge—Ga—S glass and alkali metal halide, and the content of rare earth element is in the range of 0.01 to 0.1 at % based on the total amount of Ge—Ga—S glass, alkali metal halide and rare earth element. Preferably, the alkali metal halide is KBr, CsBr, KI or CsI.

When KBr or CsBr is used as the alkali metal halide, an improvement of fluorescence lifetime at the 1.31 μm band is excellent regardless of the content of alkali metal halide. It is more preferable that the alkali metal halide content is greater than or equal to the Ga content, in view of the improvement of fluorescence lifetime.

When the alkali metal halide is KI or CsI, it is preferable that the Ga content in the Ge—Ga—S glass is 10 at % or more based on the total composition of the glass, for more improvement of the fluorescence lifetime at the 1.31 μm band. It is more preferable that the alkali metal halide content is greater than or equal to the Ga content, in view of the fluorescence lifetime increase at the 1.31 μm band.

It The object of the present invention is achieved by an optical fiber for an optical amplifier, comprising a germanium-gallium-arsenic-sulfide (Ge—Ga—As—S) glass, an alkali metal halide, and dysprosium (Dy) as a rare earth element.

Preferably, the content of alkali metal halide is in the range of approximately 1 to 20 mol % based on the total amount of Ge—Ga—As—S glass and alkali metal halide, and the content of rare earth element is in the range of approximately 0.01 to 0.1 mol % based on the total amount of Ge—Ga—As—S glass, alkali metal halide and rare earth element.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
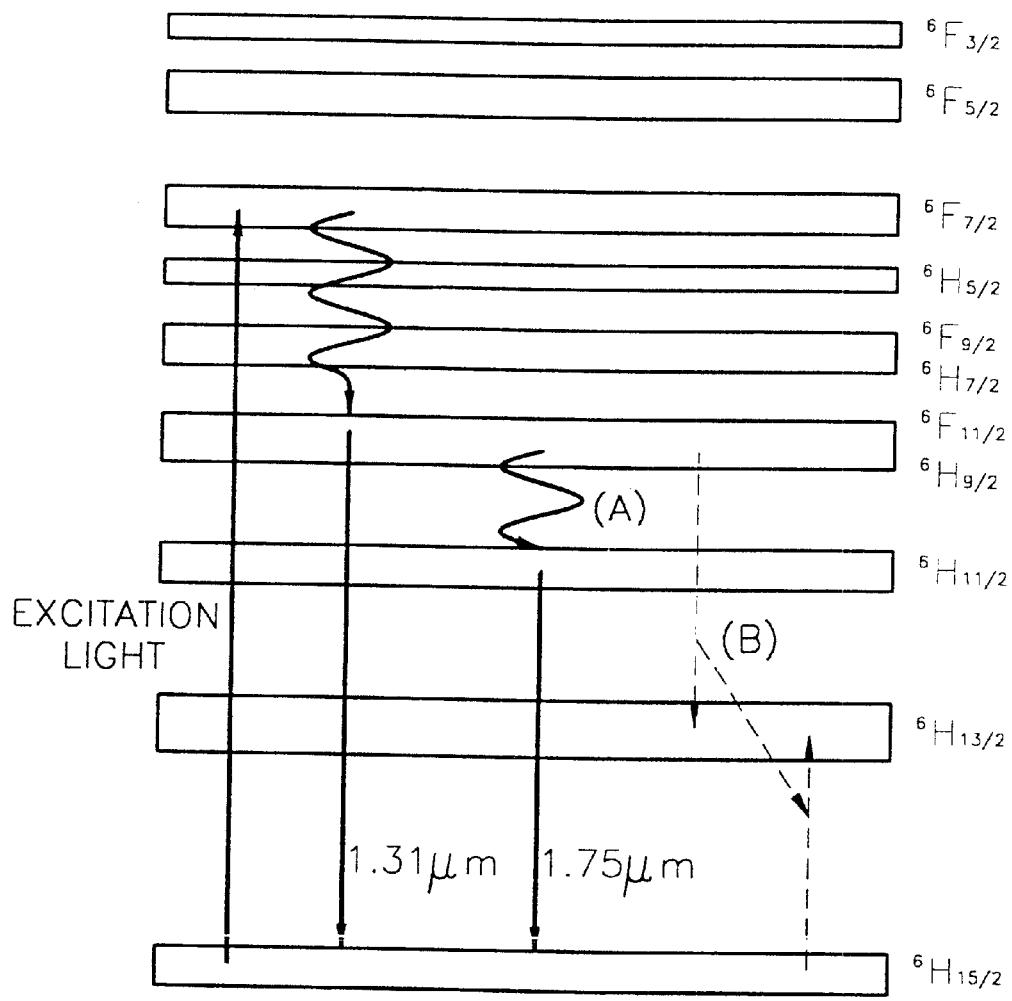
FIG. 1 is an energy level diagram of dysprosium ions ($Dy^{3+}$)

FIG. 1 is an energy level diagram of dysprosium ion ($Dy^{3+}$). Referring to FIG. 1, fluorescence emission of $Dy^{3+}$ at a wavelength 1.31 μm, occurs during transition from excited levels $^6F_{12/2}$ and $^6H_{9/2}$ to ground level $^6H_{15/2}$.

Table 1 comparatively shows the performance of optical amplifiers manufactured by implanting $Dy^{3+}$ and $Pr^{3+}$ which emit fluorescence at 1.31 μm, respectively, into a germanium-gallium-sulfide (Ge—Ga—S) glass base.

TABLE 1

| Performance | $Pr^{3+}$ | $Dy^{3+}$ |
|---|---|---|
| Cross-section of stimulated emission ($10^{-20}$ cm$^2$) | 1.05 | 4.35 |
| Fluorescence lifetime (μs) | 300 | 38 |
| Quantum efficiency (%) | 0.60 | 0.17 |
| Branching ratio (%) | 0.60 | 0.91 |

Table 1 shows that the cross-section of stimulated emission is four times or more in $Dy^{3+}$ than in $Pr^{3+}$, and the branching ratio in $Dy^{3+}$ is also higher than that in $Pr^{3+}$. Also, in contrast to $Pr^{3+}$, $Dy^{3+}$ exhibits several absorption peaks in the near infrared zone with the advantage of easy excitation. However, the substantial fluorescence lifetime of $Dy^{3+}$ is only 10% of that of $Pr^{3+}$. Thus, $Dy^{3+}$ has a disadvantage of a very low fluorescence efficiency and a very low gain coefficient required for light amplification.

The short fluorescent lifetime of $Dy^{3+}$ is caused by a multiphonon relaxation. The multiphonon relaxation will not be described in greater detail.

The energy difference of $Dy^{3+}$ between the excited levels $^6F_{12/2}$ and $^6H_{9/2}$, and the nearest low level $^6H_{12/2}$ is even less at about 1800 cm$^{-1}$ than that of $Pr^{3+}$, so that the multiphonon relaxation rate far exceeds the emission rate at 1.31 μm. As a result, most excited ion energy is lost due to interaction of ion and phonon. Thus, in the case where an oxide glass, which has a relatively high phonon energy, or a fluoride glass, which has a relatively low phonon energy, is used as a base material for $Dy^{3+}$, the fluorescence emission at 1.31 μm is not possible. However, a sulfide glass allows the fluorescence emission at the wavelength of 1.31 μm, providing the possibility of using the sulfide glass as a base material for $Dy^{3+}$.

As described above, in spite of a high potentiality of $Dy^{3+}$ as an active ion for light amplification, due to lack of a base material that is able to realize the potentiality of $Dy^{3+}$, the use of $Dy^{3+}$ as the active ion for optical amplifiers having the wavelength of 1.31 μm is impractical for certain applications.

The fluorescence lifetime and light amplification efficiency of dysprosium ion ($Dy^{3+}$) at a 1.31 μm band vary depending on the degree of nonradiative transition, during which the energy excited at the $^4F_{11/2}$ and $^6H_{9/2}$ levels is exhausted in forms other than light. Such nonradiative transition is classified into multiphonon relaxation designated with (A) in FIG. 1, which is caused by the lattice vibration energy of glass, and energy transfer between neighbours $Dy^{3+}$, which is art; designated with (B) in FIG. 1.

Among these nonradiative transition phenomenons, multiphonon relaxation due to the lattice vibration considerably contributes to a decrease in light amplification efficiency by reducing the density of electrons of $Dy^{3+}$ at $^6F_{11/2}$ and $^6H_{9/2}$ levels. Thus, it is necessary to minimize the multiphonon relaxation rate for use of $Dy^{3+}$ as active ions for a 1.31-μm optical amplifier. In the case where luminescent ions such as rare earth ions are kept in a solid base such as crystal or glass, the luminescence ions are excited by absorbing an external energy source, and then transited to the ground state or a lower energy level, generating light energy. In this way, the multiphonon relaxation refers to the dissipation of useful light energy by electron-phonon interaction. In the multiphonon relaxation, the energy difference between the energy level of elements constituting the base surrounding the luminescent ions, and the nearest low energy level, is an important concern. In general, the energy difference of the two energy levels is several times higher than the lattice vibration energy of the host, and thus multiple phonons are required to consume the excited ion energy by the host lattice vibration. Also, the multiphonon relaxation rate is inversely proportional to exponential of the number of phonons. Thus, if the energy difference between the two levels is constant, the lattice vibration energy of the host should be as low as possible to increase the number of phonons, which reduces the multiphonon relaxation rate.

However, the lattice vibration energy of a host is inversely proportional to the square root of the mass of atoms which constitute the host, and is proportional to the square root of the bond constant of the atoms. Thus, the multiphonon relaxation rate can be reduced by using the host which Ad has large-mass atoms and a weak binding force between the atoms. Also, the multiphonon relaxation rate varies depending on the coupling strength of the electrons of the rare earth ions, and phonons that are present in the host. Thus, the multiphonon relaxation rate can also be lowered by reducing the electron-to-phonon interaction such that the coupling strength therebetween is minimized.

A sulfide glass has a lattice vibration energy of about 350 cm$^{-1}$, which is considerably low compared to that of an oxide glass and fluoride glass. Thus, the sulfide glass seems to have a low multiphonon relaxation rate. However, the sulfide glass as a host decreases the fluorescence lifetime at $^6F_{11/2}$ and $^6H_{9/2}$ by $Dy^{3+}$ to approximately 38 μsec with a quantum efficiency of 17% or less Accordingly, the electron-phonon coupling strength in the sulfide glass must be minimized.

The present invention is for improving the fluorescence efficiency by $Dy^{3+}$ at a 1.31 μm band in an optical fiber adopting $Dy^{3+}$ as active ions, in which a general sulfide glass, which has a low lattice vibration energy, is adopted and bromine (Br) or iodine (I), which has a very weak electron-phonon coupling strength with a large mass, compared to the constituent elements of the sulfide glass, is added to minimize the electron-phonon interaction in the sulfide glass.

Hereinafter, the optical fibre for optical amplifiers according to the present invention will be described in greater detail.

The optical fiber of the present invention includes a germanium-gallium-sulfide (Ge—Ga—S) or germanium-gallium-arsenic-sulfide (Ge—Ga—As—S) glass and an alkali metal halide, and Dy, which is a rare earth element, is in the form of ions ($Dy^{3+}$). Any alkali metal halide can be used for the optical fiber. However, KBr, CsBr, KI or CsI is preferred as the alkali metal halide. The content of the alkali metal halide is in the range of approximately 1 to 20 mol %, and more preferably, of approximately 1 to 10 mol %, based on the total amount of glass and alkali metal halide. If the alkali metal halide content is less than 1 mol %, the fluorescence emission efficiency of the optical fiber is poor. Meanwhile, if the alkali metal halide content is more than 20 mol %, the thermal and chemical properties of the optical fiber are deteriorated.

The Ge—Ga—As—S glass has been devised to lower the tendency of crystallization of the Ge—Ga—S glass during the manufacture of optical fibers. In the Ge—Ga—S glass, Ge is susceptible to glassification, whereas Ga shows a high crystallization tendency with poor glassification capability. Thus, the glassification is hindered by Ga during optical fiber manufacture. In order to prevent the crystallization tendency in the use of a sulfide glass, As (arsenic) having excellent glassification capability is added in the case of using the sulfide glass is used as a host for forming optical fibers. 25–30 mol % of Ge, 2–10 mol % of Ga, 5–10 mol % of As, and 60–65 mol % of S are contained in the Ge—Ga—As—S or Ge—Ga—S glass based on the total composition of the glass.

Preferably, the $Dy^{3+}$ content, as a rare earth element, is in the range of 0.01 to 0.1 mol % based on the total composition of the optical fiber including the Ge—Ga—S glass or Ge—Ga—As—S glass, the alkali metal halide and the rare earth element. If the $Dy^{3+}$ content is more than 0.1 mol %, concentration quenching due to cross relaxation occurs, thereby lowering light amplification efficiency. $Dy_2S_3$ is used as a source of $Dy^{3+}$, Ge ingot is used as a source of Ge, Ga powder is used as a source of Ga, and As lump is used as a source of As.

For the alkali metal halide, KBr or CsBr is better than CsI or KI in view of an improvement of fluorescence lifetime at 1.31 µm. Preferably, the alkali metal halide content is greater than or equal to the Ga content. More preferably, the alkali metal halide content is equal to the Ga content in view of the chemical stability of the glass and the solubility of the rare earth element in the glass. If the alkali metal halide content is too excessive relative to the Ga content, the thermal stability of the glass and the solubility of the rare earth element sharply decrease.

For example, the increase in fluorescence lifetime at 1.31 µm is larger in the composition of $0.95[Ge_{32}Ga_5S_{63}]$–0.05KBr or $0.95[Ge_{32}Ga_5S_{63}]$–0.05CsBr than in the composition of $0.95[Ge_{25}Ga_{10}S_{65}]$–0.05KBr or $0.95[Ge_{25}Ga_{10}S_{65}]$–0.05CsBr. It is understood that the aforementioned is shorthand notation as explained in U.S. Pat. No. 6,148,125 to Heo et al, col 8, lines 33–35. For example, $0.95[Ge_{32}Ga_5S_{63}]$–0.05KBr simply means 5 mol % KBr and 95 mol %$[Ge_{32}Ga_5S_{63}]$.

Also, when the alkali metal halide used is CsI or KI, it is preferable that the Ga content is 10 mol % or more based on the total composition of the glass. Preferably, the alkali metal halide is greater than or equal to the Ga content in view of the fluorescence lifetime improvement at 1.31 µm band. In other words, if the alkali metal halide content is less than the Ga content, there is no great improvement in fluorescence lifetime at the 1.31 µm band.

In manufacturing the optical fiber according to the present invention, Ge, Ga and S, each having a high purity, a source of $Dy^{3+}$, such as $Dy_2S_3$, and an alkali metal halide are used, and these components are mixed in a glove box which is conditioned with an inert gas without oxygen.

First, Ge, Ga, S and the source of $Dy^{3+}$ are mixed in a desired ratio, and a predetermined amount of the alkali metal halide is added to the mixture. A predetermined amount of the mixture containing the alkali metal halide is put into a silica ampule, and then sealed under a vacuum condition. Then, the silica ampule filled with the mixture is fused in a furnace at a temperature higher than 900 degrees Celsius and less than or equal to 1100° C., and preferably, at a temperature of 950–1000° C. If the temperature of the furnace is higher than 1100° C., the silica ampule containing the mixture may explode due to high vapour pressure. Meanwhile, if the temperature of the furnace is lower than 900° C., the rare earth element, which has a high fusing point, does not fuse.

Then, the silica ampule containing the fused composition is quenched. Any technique can be adopted for the quenching of the heated silica ampule. However, it is preferable to quench the heated silica ampule in the air.

Following this, the quenched silica ampule containing the composition is heated at near the glass transition temperature of the glass host, i.e., at 300–400° C., cooled and then broken, resulting in a glass rod. The obtained glass rod is heated and drawn, resulting an optical fiber according to the present invention.

Hereinafter, the present invention will be described in greater detail using the following examples. However, these examples are merely illustrative and the present invention is not limited thereto.

EXAMPLE 1

Ge, Ga and S, each having a purity of 99.999% or more, and KBr having a purity of 99.9%, were weighted in a glove box in an argon gas atmosphere, to prepare the composition of $0.90[Ge_{25}Ga_{10}S_{65}]$–0.10KBr. Then, 0.05 mol % of $Dy_2S_3$ having a purity of 99.9% was added to composition for the purpose of implanting $Dy^{3+}$ into the host composition.

10 g of the obtained composition was put into a silica ampule and then sealed under a vacuum condition. The silica ampule filled with the composition was fused at a furnace which was set at 950° C. for 12 hours, and then quenched in the air. Following this, the silica ampule were heated at 350° C. for 2 hours, cooled and broken, resulting in a glass rod. The obtained glass rod is cut into a disc shape with a thickness of 5 mm and polished to obtain optical fiber preforms. The obtained glass rod is heated and drawn, resulting an optical fiber according to the present invention.

EXAMPLE 2

An optical fiber was manufactured in the same manner as in Example 1 except that KI was used instead of KBr to prepare $0.90[Ge_{25}Ga_{10}S_{65}]$–0.10 KI.

EXAMPLE 3

An optical fiber was manufactured in the same manner as in Example 1 except that CsBr was used instead of KBr to prepare $0.90[Ge_{25}Ga_{10}S_{65}]$–0.10CsBr.

EXAMPLE 4

An optical fiber was manufactured in the same manner as in Example 1 except that CsI was used instead of KBr to prepare $0.90[Ge_{25}Ga_{10}S_{65}]$–0.10CsI.

EXAMPLE 5

An optical fiber was manufactured in the same manner as in Example 1 except that $0.95[Ge_{25}Ga_{10}S_{65}]$–0.05KBr was prepared instead of $0.90[Ge_{25}Ga_{10}S_{65}]$–0.10KBr.

EXAMPLE 6

An optical fiber was manufactured in the same manner as in Example 5 except that CsBr was used instead of KBr to prepare $0.95[Ge_{25}Ga_{10}S_{65}]$–0.05CsBr.

EXAMPLE 7

An optical fiber was manufactured in the same manner as in Example 1 except that is $0.95[Ge_{32}Ga_5S_{63}]$-$0.05KBr$ was prepared instead of $0.90[Ge_{25}Ga_{10}S_{65}]$-$0.10KBr$.

EXAMPLE 8

An optical fiber was manufactured in the same manner as in Example 7 except that CsBr was used instead of KBr to prepare $0.95[Ge_{32}Ga_5S_{63}]$-$0.05CsBr$.

EXAMPLE 9

An optical fiber was manufactured in the same manner as in Example 1 except that $0.96[Ge_{32}Ga_5S_{63}]$-$0.04CsBr$ was prepared instead of $0.90[Ge_{25}Ga_{10}S_{65}]$-$0.10$ KBr.

EXAMPLE 10

An optical fiber was manufactured in the same manner as in Example 1 except that $0.97[Ge_{32}Ga_5S_{63}]$-$0.03CsBr$ was prepared instead of $0.90[Ge_{25}Ga_{10}S_{65}]$-$0.10KBr$.

EXAMPLE 11

An optical fiber was manufactured in the same manner as in Example 1 except that $0.95238[Ge_{29}Ga_5S_{66}]$-$0.04762CsBr$ was prepared instead of $0.90[Ge_{25}Ga_{10}S_{65}]$-$0.10KBr$.

EXAMPLE 12

An optical fiber was manufactured in the same manner as in Example 1 except that $0.95[Ge_{29}Ga_5S_{66}]$-$0.05KI$ was prepared instead of $0.90[Ge_{25}Ga_{10}S_{65}]$-$0.10$ KBr.

EXAMPLE 13

An optical fiber was manufactured in the same manner as in Example 12 except that CsI was used instead of KI to prepare $0.95[Ge_{29}Ga_5S_{66}]$-$0.05CsI$.

EXAMPLE 14

An optical fiber was manufactured in the same manner as in Example 1 except that As having a purity of 99.999% or more was added and CsBr was used instead of KBr, to prepare $0.95[Ge_{30}As_9Ga_{10}S_{60}]$-$0.05CsBr$, instead of $0.90$ $[Ge_{25}Ga_{10}S_{65}]$-$0.10KBr$.

Comparative Example

An optical fiber was manufactured in the same manner as in Example 1 except that no KBr was added to $Ge_{29}Ga_{10}S_{65}$, instead of $0.90[Ge_{25}Ga_{10}S_{65}]$-$0.10KBr$.

For the optical fibers manufactured in Examples 1 through 14 and the Comparative Example, the fluorescence lifetime of $Dy^{3+}$ at $^6F_{11/2}$ and $^6H_{9/2}$ levels was measured. The fluorescence designated with τ, which is defined as the point in time at which the fluorescence intensity reaches 1/e of the initial level, was measured using a digitized oscilloscope. Also, the fluorescence lifetime designated with $τ_R$, which is defined as the point in time at which the fluorescence intensity reaches 1/e of the initial level under the assumption that only radiative transition by electron transition occurs, was calculated. Quantum efficiency designated with η was defined as the ratio of the measured and calculated fluorescence lifetimes.

Here, an $Ar^{-1}$ laser-driven titanium (Ti)-sapphire laser emitting 914 nm light was used as a light source for excitation. After exciting $Dy^{3+}$ to $^6F_{7/2}$ level, which are kept in the lattice of the glass base formed of Ge—Ga—S or Ge—Ga—As—S and the alkali metal halide, with the titanium-sapphire laser, the fluorescence produced was detected by a InSb photodetector and the wavelength thereof was screened by a ¼m-double monochromator. Also, the detected fluorescence was analysed by a lock-in amplifier.

As a result, the fluorescence lifetime of the optical fiber manufactured in Example 1 was 420 μsec and the quantum efficiency thereof was 90%. The fluorescence lifetime of the optical fiber in Example 1 was increased compared to the optical fiber manufactured in the Comparative Example, which had a fluorescence lifetime of 38 μsec and a quantum efficiency of 16.6%. Such an increase in fluorescence lifetime is due to a decrease in the multiphonon relaxation rate of $Dy^{3+}$ from $^6F_{11/2}$ and $^6H_{9/2}$ to $^6H_{11/2}$ by the addition of KBr to the Ge—Ga—S glass.

Also, the fluorescence lifetime of the optical fiber in Example 2 was 270 μsec, and the optical fiber in Example 3 exhibited the longest fluorescence lifetime at 1.26 msec. This result supports that the use of CsBr further contributes to reducing the multiphonon relaxation rate of $Dy^{3+}$ from $^6F_{11/2}$ and $^6H_{9/2}$ levels to $^6H_{11/2}$ level. Also, the fluorescence lifetime was 190 μsec in Example 4, 44 μsec in Example 5, 60 μsec in Example 6, 650 μsec in Example 7, and 1.12 msec in Example 8.

As in Examples 5 and 6, where KBr or CsBr was added to the Ge—Ga—S glass, the fluorescence lifetime was slightly increased compared to the Comparative Example. However, as in Examples 7 and 8, by adding KBr or CsBr into the Ge—Ga—S glass with a variation of the composition of the glass, the increase in the fluorescence lifetime due to the addition of bromide was remarkable.

Also, the fluorescence lifetime of the optical fiber manufactured in Example 9 was 107 μsec, and that of the optical fiber in Example 10 was 72 μsec. That is, in the case where the addition ratio of bromide to the Ge—Ga—S glass was low, the increase in the fluorescence lifetime was not evident compared to Examples 1 through 4, and Examples 7 and 8.

From the results of Examples 1, 3 and 5 through 10, it can be ascertained that the increase in fluorescence lifetime at 1.31 μm is very slight when the ratio of bromide to Ga is low. In order to verify the effect of the bromide-to-Ga ratio on the increase in fluorescence lifetime, the amount of CsBr was increased in Example 11 such that the CsBr content was equal to the Ga content. As a result, the fluorescence lifetime was increased to 1.13 msec. Thus, it can be concluded that only when the CsBr content is greater than or equal to Ga content, the multiphonon relaxation rate decreases.

However, in the case where 5 mol % of KI or CsI was added to 95 mol % of $Ge_{29}Ga_5S_{66}$ as in Examples 12 and 13, the fluorescence lifetime improvement was negligible, compared to the effect of CsBr. The fluorescence lifetime was 55 μsec for Example 12, and 59 l sec for Example 13. Also, the optical fiber manufactured in Example 14 showed a remarkable improvement in fluorescence lifetime at 720 μsec compared with that of Comparative Example.

Figure 2:
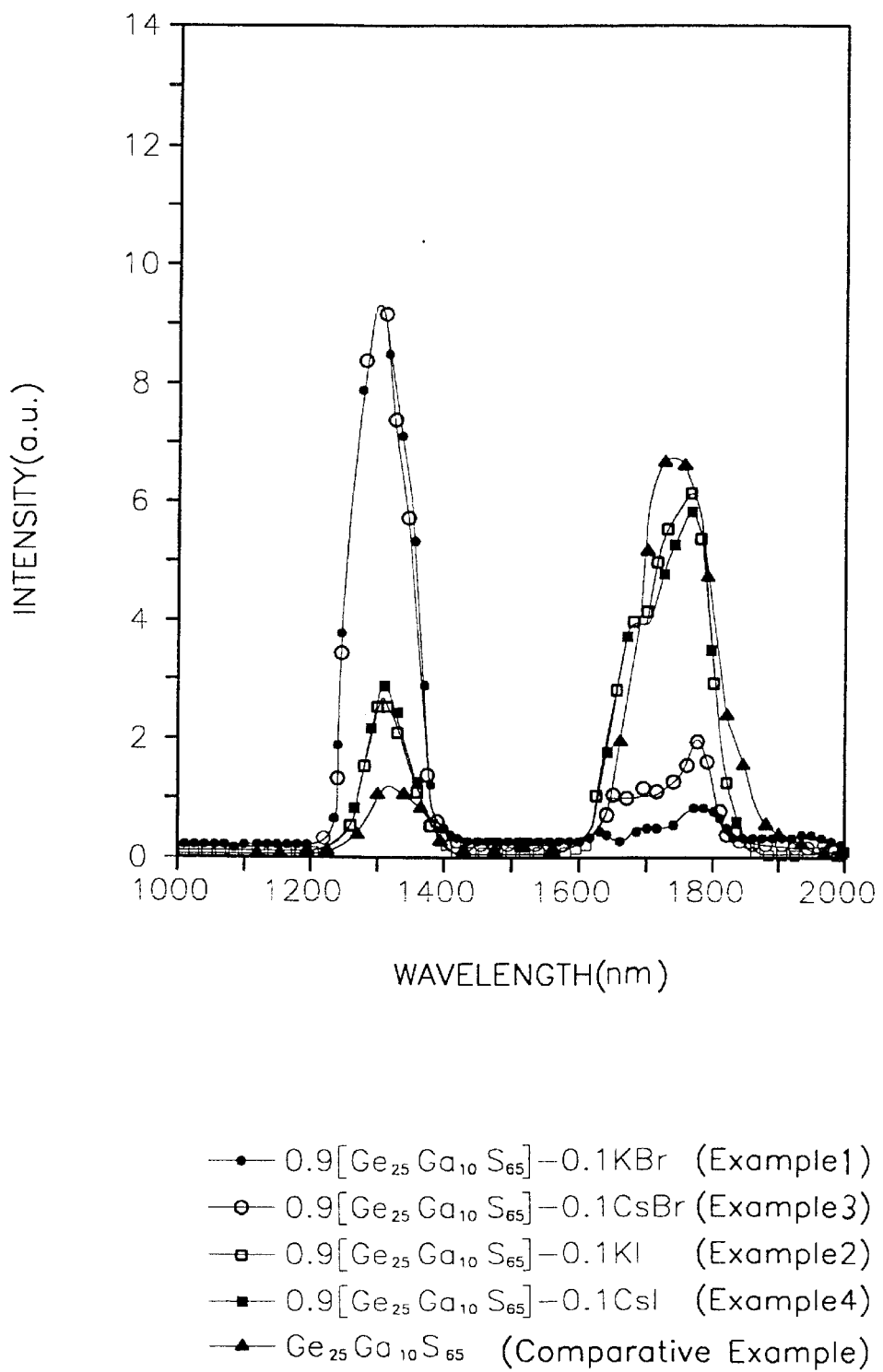
FIG. 2 shows the fluorescence emission spectrum of $Dy^{3+}$ when a laser emitting 914 nm light irradiated onto optical fibers which were manufactured in Examples 1–4 and Comparative Example.

FIG. 2 shows the fluorescence emission spectrum at 1.31 μm and 1.75 μm of the optical fibers manufactured in Examples 1 through 4 and the Comparative Example, when $Dy^{3+}$ is excited to $^6F_{7/2}$ using a laser emitting 914 nm light as an excitation source. The fluorescence emission at 1.31 μm is due to the transition from and to the ground level, and that at 1.75 μm is due to the transition from to the ground level.

Referring to FIG. 2, the Comparative Example shows a very small fluorescence intensity at 1.31 μm compared to that shown at 1.75 μm. This result is associated with the multiphonon relaxation rate. Because in the case of using a Ge—Ga—S glass as a glass base, the multiphonon relaxation rate reaches 20000 sec$^{-1}$, which is 5 times higher than the spontaneous fluorescence emission rate at 1.31 μm (about 4000 sec$^{-1}$), most of Dy$^{3+}$ excited to $^4F_{11/2}$ and $^6H_{9/2}$ cannot emit at fluorescence at 1.31 μm and then transit to the lower energy level $^6H_{11/2}$, emitting fluorescence at 1.75 μm. Thus, the intensity of fluorescence at 1.75 μm is stronger than that at 1.31 μm.

Also, in Examples 1 and 3 where bromide was added to a Ge—Ga—S glass, the multiphonon relaxation rate sharply decreased, so that the intensity of fluorescence at 1.31 μm was much stronger than at 1.75 μm. Also, in the case of adding iodide to a Ge—Ga—S glass as in Examples 2 and 4, the relative intensity of the fluorescence at 1.31 μm to that at 1.75 μm was very small compared to the case of using bromide as in Examples 1 and 3.

Figure 3:
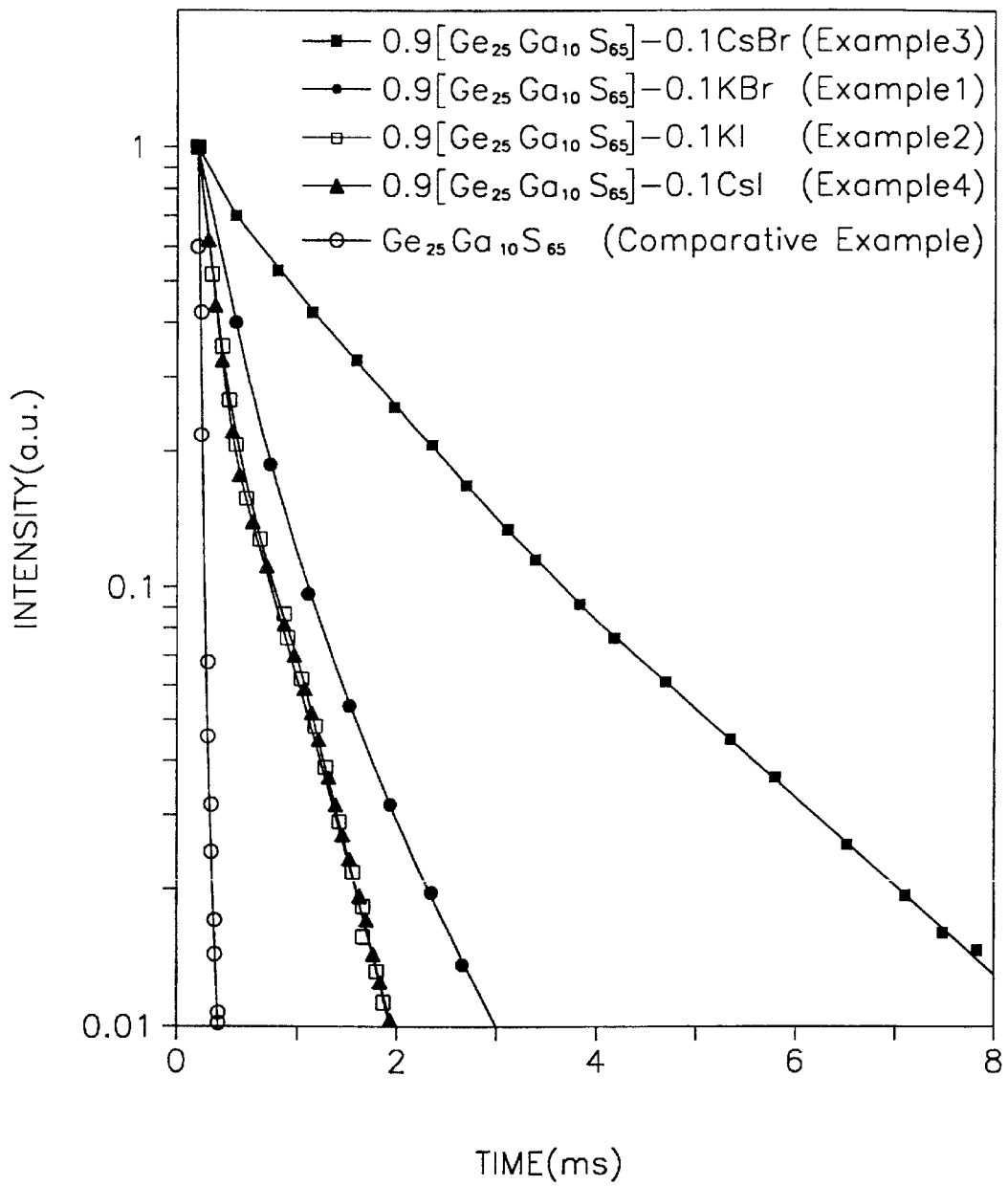
FIG. 3 shows the variation of fluorescence intensity of $Dy^{3+}$ at a 1.31 μm band with respect to time when a laser emitting 914 nm light is irradiated onto optical fibers which were manufactured for use in optical amplifiers in Examples 1–4 and Comparative Example.

FIG. 3 shows the variation of the fluorescence intensity at 1.31 μm with respect to time for each of the optical amplifiers manufactured in Examples 1 through 4 and the Comparative Example, wherein Dy$^{3+}$ was excited to $^6F_{7/2}$ with a laser emitting 914 nm light to produce fluorescence at 1.31 μm, which is caused by transition from $^6F_{11/2}$ and $^6H_{9/2}$ levels to the ground level.

Referring to FIG. 3, the fluorescence intensity slowly decreased in Examples 1 through 4 compared to the Comparative Example. This result supports the increase in the fluorescence lifetime in Examples 1 through 4.

As described above, in the manufacture of the optical fiber that contains Dy$^{3+}$ as an active ion according to the present invention, a sulfide glass having a low lattice vibration energy is used as a glass host, and the alkali metal halide, which is able to minimize the interaction of electrons of Dy$^{3+}$ and phonons in the glass lattice, is added. As a result, the multiphonon relaxation of Dy$^{3+}$ from $^4F_{11/2}$ and $^6H_{9/2}$ levels to the nearest lower energy level $^6H_{9/2}$ is slowed down, and thus the fluorescence lifetime at 1.31 μm is elongated, further improving the fluorescence efficiency of the optical fiber.

What is claimed is:

1. An optical fiber for an optical amplifier, comprising a glass comprising germanium-gallium-sulfide (Ge—Ga—S), an alkali metal halide, and dysprosium (Dy) as a rare earth element, wherein a mol % of alkali metal halide content is greater than a mol % of Ga content.

2. The optical fiber of claim 1, wherein the mol % of the alkali metal halide content is greater than 2% and can be as high as 20% of the total content of Ge—Ga—S glass and said alkali metal halide content and a rare earth content, a mol % of rare earth element is in the range of approximately 0.01 to 0.1% of a total content of Ge—Ga—S glass, said alkali metal halide and said rare earth element.

3. The optical fiber of claim 2, wherein the alkali metal halide content is selected from a group consisting of KBr, CsBr, KI and CsI.

4. The optical fiber of claim 3, wherein the alkali metal halide content is selected from a group consisting of KBr and CsBr.

5. The optical fiber of claim 3, wherein when the alkali metal halide content is selected from a group consisting of KI and CsI, the Ga content in the Ge—Ga—S glass is at least 10 mol % of the total composition of the glass.

6. An optical fiber for an optical amplifier, comprising a germanium-gallium-arsenic-sulfide (Ge—Ga—As—S) glass, an alkali metal halide content, and dysprosium (Dy) as a rare earth element, formed by fusing at a temperature higher than 900 degrees Celsius and less than or equal to 1100 degrees Celsius.

7. The optical fiber of claim 6, wherein the alkali metal halide content is in the range of greater than 2 mol % but no more than 20 mol % of the total content of Ge—Ga—As—S glass, said alkali metal halide content and said rare earth content, the content of rare earth element being in the range of approximately 0.01 to 0.1 mol % of the total content of Ge—Ga—As—S glass, said alkali metal halide content and said rare earth element.

8. The optical fiber of claim 7, wherein the alkali metal halide content is selected from a group consisting of KBr, CsBr, KI and CsI.

9. The optical fiber of claim 8, wherein the alkali metal halide content is selected from a group consisting of KBr and CsBr.

10. The optical fiber of claim 8, wherein the alkali metal halide content is greater than or equal to the Ga content.

11. The optical fiber of claim 8, wherein the alkali metal halide content being selected from a group consisting of KI and CsI, the Ga content in the Ge—Ga—As—S glass being at least 10 mol % of the total content of the total composition of the glass.

12. The optical fiber of claim 10, wherein the alkali metal halide content is greater than or equal to the Ga content.

13. The optical fiber of claim 1 wherein the Ga, Ge, S, Dy, and said alkali metal halide content are fused at a temperature higher than 900 degreesw Celsius and less than or equal to 1100 degrees Celsius.

14. A method for making an optical fiber, comprising the steps of:

mixing Ge, Ga, S, and Dy$_2$S$_3$ with an alkali metal halide content;

fusing the mixture in a furnace at a temperature higher than 900 degrees Celsius and less than or equal to 1100 degrees Celsius;

quenching the above heated mixture;

reheating the mixture to 300 to 400 degrees Celsius; and drawing an optical fiber from said mixture as said mixture is cooled below 300 to 400 degrees Celsius.

15. The method of claim 14, wherein said fusing and quenching occurs with said mixture in a silica ampule.

16. The method of claim 14, wherein the composition of said alkali metal halide content is at least the composition of Ga, said composition of Ga being at least 10% of the total composition of the mixture.

17. The method of claim wherein 14, said Dy$_2$S$_3$ is decomposed during said fusing step allowing Dy$^{3+}$ ions to be distributed throughout said optical fiber.

18. The method of claim 14, wherein said alkali metal halide content comprises either KI or KBr.

19. The optical fiber of claim 2, said optical fiber being produced by a method comprising the steps of:

mixing Ge, Ga, S, and Dy$_2$S$_3$ with an alkali metal halide content;

fusing the mixture in a furnace at a temperature higher than 900 degrees Celsius and less than or equal to 1100 degrees Celsius;

quenching the above heated mixture;

reheating the mixture to 300 to 400 degrees Celsius; and drawing an optical fiber from said mixture as said mixture is cooled below 300 to 400 degrees Celsius.

20. The method of claim 12, said optical fiber comprising:

a glass comprising germanium-gallium-sulfide (Ge—Ga—S), an alkali metal halide, and dysprosium (Dy) as a rare earth element, wherein a mol % of alkali metal halide content is greater than a mol % of Ga content, wherein the mol % of the alkali metal halide content is greater than 2 % and can be as high as 20% of the total amount of Ge—Ga—S glass and said alkali metal halide content, a mol % of rare earth element is in the range of approximately 0.01 to 0.1% of a total content of Ge—Ga—S glass, said alkali metal halide and said rare earth element.

* * * * *